(12) United States Patent
Duffy et al.

(10) Patent No.: US 8,352,456 B2
(45) Date of Patent: Jan. 8, 2013

(54) PRODUCER/CONSUMER OPTIMIZATION

(75) Inventors: John J. Duffy, Renton, WA (US); Henricus Johannes Maria Meijer, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 590 days.

(21) Appl. No.: 11/747,772

(22) Filed: May 11, 2007

(65) Prior Publication Data
US 2008/0281786 A1 Nov. 13, 2008

(51) Int. Cl.
*G06F 7/00* (2006.01)
*G06F 17/30* (2006.01)

(52) U.S. Cl. ........................................ 707/713; 707/719

(58) Field of Classification Search .................. 707/713, 707/719, 999.002
See application file for complete search history.

(56) References Cited

U.S. PATENT DOCUMENTS

| | | |
|---|---|---|
| 5,590,319 A | 12/1996 | Cohen et al. |
| 5,857,180 A | 1/1999 | Hallmark et al. |
| 6,009,265 A | 12/1999 | Huang et al. |
| 6,625,593 B1 | 9/2003 | Leung et al. |
| 6,968,335 B2 | 11/2005 | Bayliss et al. |
| 7,051,034 B1 | 5/2006 | Ghosh et al. |
| 7,146,365 B2 | 12/2006 | Allen et al. |
| 2005/0165798 A1 | 7/2005 | Cherkauer et al. |

OTHER PUBLICATIONS

Ganguly et al., "Query Optimization for Parallel Execution", Proceedings of the 1992 ACM SIGMOD international conference on Management of data, p. 9-18, Jun. 2-5, 1992, San Diego, California, United States.*

Graefe, "Volcano—An Extensible and Parallel Query Evaluation System", IEEE Transactions on Knowledge and Data Engineering. vol. 6, No. I. pp. 120-135, Feb. 1994, IEEE.*

Bouganim et al., "A Dynamic Query Processing Architecture for Data Integration Systems", Bulletin of the IEEE Computer Society Technical Committee on Data Engineering, 2000, IEEE.*

Bala et al., "Dynamo: a transparent dynamic optimization system", PLDI '00 Proceedings of the ACM SIGPLAN 2000 conference on Programming language design and implementation, pp. 1-12, 2000, ACM.*

Girbal et al., "Semi-Automatic Composition of Loop Transformations for Deep Parallelism and Memory Hierarchies", International Journal of Parallel Programming, vol. 34, No. 3, pp. 261-317, 2006, Spreinger Verlag Berlin Heidelberg.*

Qasem et al., "Profitable loop fusion and tiling using model-driven empirical search", ICS '06 Proceedings of the 20th annual international conference on Supercomputing, pp. 249-256, 2006, ACM.*

Pouchet aet al., "Combined Iterative and Model-driven Optimization in an Automatic Parallelization Framework", SC '10 Proceedings of the 2010 ACM/IEEE International Conference for High Performance Computing, Networking, Storage and Analysis, pp. 1-11, 2010, ACM.*

Ganguly, et al. "Query Optimization for Parallel Execution," Hewlett-Packard Laboratories, http://delivery.acm.org/10.1145/140000/130291/p9-ganguly.pdf?key1=130291&key2=3748847311&coll=GUIDE&dl=GUIDE&CFID=65859593&CFTOKEN=60779184, Jun. 1992, last accessed Feb. 14, 2007, 10 pages.

(Continued)

*Primary Examiner* — Michael Hicks

(57) ABSTRACT

Systems and methods facilitate efficient data processing in a computer environment. Data producers and consumers are considered in aggregate rather than in isolation. In one instance, interaction between data producers and consumers is improved by integrating producers and consumers. Optimization can subsequently be performed over the combination to produce synergistic results.

12 Claims, 13 Drawing Sheets

OTHER PUBLICATIONS

Lu, et al. "Optimization of Multi-Way Join Queries for Parallel Execution," Proceedings of the 17th International Conference on Very Large Data Bases, http://www.sigmod.org/vldb/conf/1991/P549.PDF, Sep. 1991, Barcelona, Spain, last accessed Feb. 14, 2007, 12 pages.

Ayres, et al. "An Extensible Query Execution Engine for Supporting New Query Execution Models," http://icwww.epfl.ch/publications/documents/IC_TECH_REPORT_2005034.pdf, last accessed Feb. 14, 2007, 16 pages.

\* cited by examiner

PRODUCER/CONSUMER OPTIMIZATION

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

A programmer using one or more programming languages creates the instructions comprising a computer program. Typically, source code is specified or edited by a programmer manually and/or with help of an integrated development environment (IDE). Subsequently, the source code can be compiled or otherwise transformed by another program into computer instructions executable by a computer or like device.

In software engineering, a plurality of design patterns are conventionally utilized in program development. A design pattern provides a framework for describing a particular issue and solutions thereto. More specifically, a design pattern is a general, repeatable solution for common issues that occur in software design. Among other things, use of design patterns speeds up development, helps prevent subtle issues and improves program readability and comprehension by those familiar with the pattern.

One basic design pattern is producer/consumer. A producer/consumer relationship is one in which a producer generates data and the consumer uses the data. This pattern is utilized in a myriad of different environments for a number of processes including, at a higher level, data warehousing for cleansing and transforming data and image processing for iterative refinement. In fact, the pattern can apply to any situation in which data is produced and consumed. One particularly prevalent use case pertains to queries.

Query execution can be seen as a traditional client/server or consumer/producer model where an entity A requests a service from another entity B, in this case the retrieval of some data that satisfies criteria and is in the shape requested. Some bi-directional communication mechanism is required such that A can instruct B about its desire and so that B may respond to A with the results. The entire result set is returned in some form and thereafter consumed for some purpose. Conventional relational database management software (RDBMS) employs cursors for the output interface with which to stream query output to the consumer. A cursor is a single stream of data that facilitates supply of data in some definite, sequential ordering.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to optimization of producer/consumer code. Instead of treating producers and consumers as black boxes, activities of a producer and one or more associated consumers can be analyzed and employed to facilitate efficient execution. In other words, optimization can be performed on a producer/consumer aggregate rather than on the producer and consumer in isolation. Furthermore, the producer and/or consumer can be an aggregate of some other producer and/or consumer such that the optimization can be recursive.

In accordance with one aspect of the disclosure, consumer activity can be merged or integrated with producer activity. In this case, consumer activity can simply be considered an extension of producer activity. As a result, an execution strategy can be generated over the integration or aggregate to implement parallelism, among other things. By way of example, if the producer corresponds to a query, novel and/or conventional query optimization approaches can be utilized that cross the producer/consumer boundary.

According to another aspect of the disclosure, consumer activity can be analyzed and employed to streamline producer execution alone or in conjunction with other optimization techniques. More particularly, a producer can be specialized to produce data solely of interest to one or more associated consumers.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are described hereinafter concerning data processing. Processing efficiency can be improved by optimizing interactions between producers and consumers. More particularly, producers and consumers can be considered en masse rather than as isolated, atomic processes. Optimizations can then be performed with respect to both data production and consumption resulting in a synergistic result. Such optimization can be accomplished via direct program specification, an application programming interface, a compiler and/or a query processor, amongst other mechanisms.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
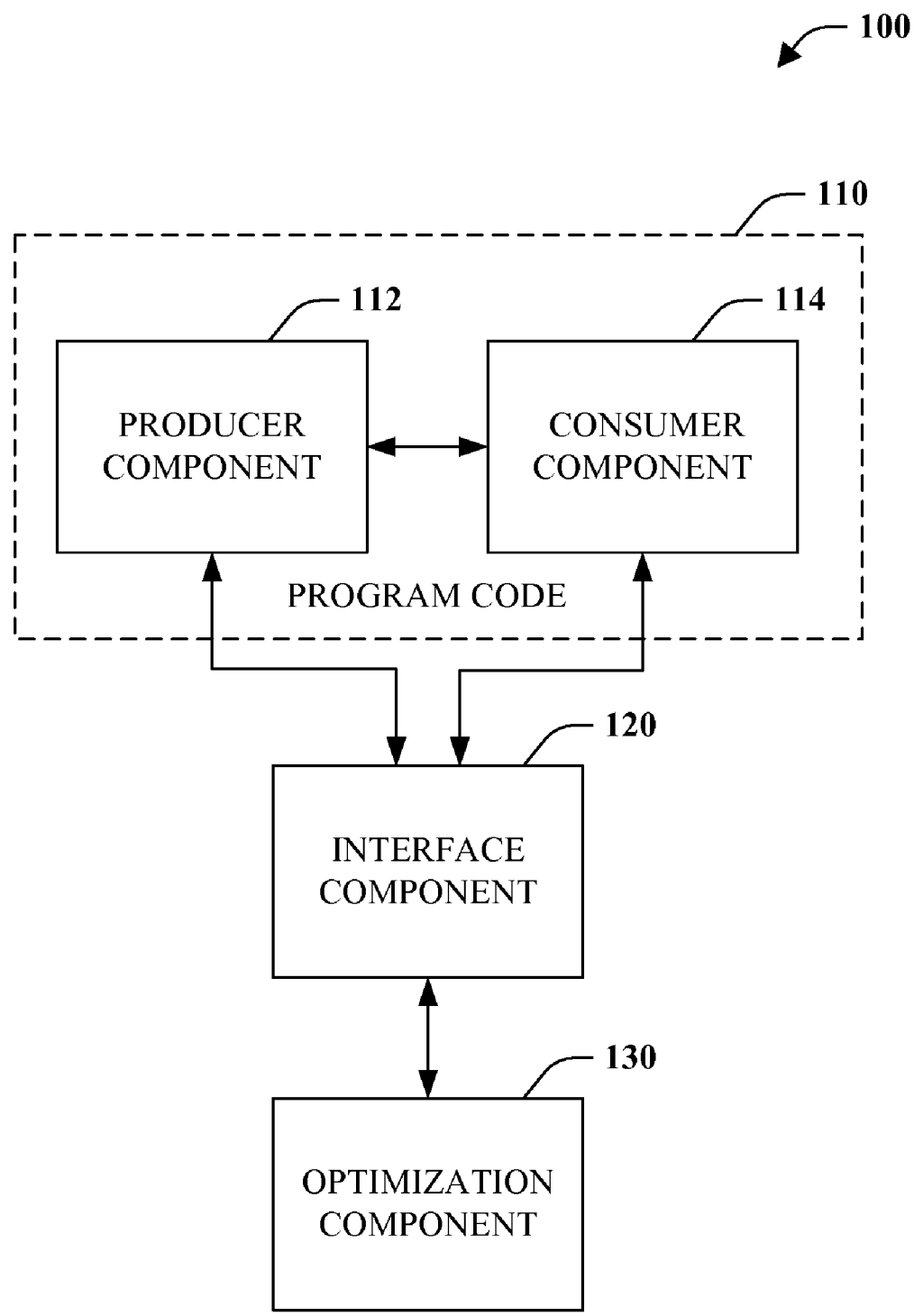
FIG. 1 is a block diagram of a code optimization system in accordance with an aspect of the claimed subject matter.

Referring initially to FIG. 1, a code optimization system 100 is illustrated in accordance with an aspect of the claimed subject matter. The system includes programmatic code 110 comprising one or more producer components 112 and consumer components 114. The producer component 112 produces or generates data that is consumed or utilized by one or more consumer components 114. As will be described further infra, consumer components 114 can also act as or include functionality of producer components 112 or vice versa, for example where there is a sequence of components that receive data, perform some action and pass the data to the next component. Further yet, the producer component 112 and consumer component 14 can operate with respect to arbitrary data types including, streams, graphs and trees, among others.

Interface component 120 is operable to receive, retrieve or otherwise obtain or identify related producer components 112 and consumer components 114 within programmatic code 110. These components or identities thereof can be provided to or made accessible by optimization component 130. The interface component 120 therefore acts as a conduit between the programmatic code 110 and the optimization component 130. Accordingly, it is also to be noted that the interface component 120 and/or portions thereof can facilitate modification of the code 110 by optimization component 130.

The optimization component 130 facilitates improving data processing by optimizing producer components 112, consumer components 114 and/or interaction between the components. Conventionally, producer components 112 and consumer components 114 are treated as isolated atomic processes. Such treatment is likely a function of traditional modular program design and/or presumed communication latency or low throughput. However, the conventional treatment can result in sub-optimal execution in many cases. For instance, this is quite limiting for scenarios with small distances or high throughput including in memory, in the same process and/or on the same machine. Further, with an increase in availability of parallel hardware and decrease in communication latency, it is important that software evolve to do more things in parallel. That includes consuming items from a producer.

Rather than treating consumer components 114 as black boxes, the optimization component 130 is operable to analyze consumer activity to facilitate optimization of the producer component 112, the consumer component 114 or both. In one instance, consumer activity associated with a producer can be utilized to refine data produced by a producer. Additionally or alternatively, at least a portion of consumer activity can be merged within a producer or at least treated as such for optimization purposes.

In essence, structure of a producer component 112 and at least one associated consumer component 114 is known or can be determined. Based thereon, the producer component 112 and the consumer component 114 are matched up in a way to optimize performance, parallelism and/or data communication. Furthermore, it is to be appreciated that once consumer activity is exposed optimizations can be performed recursively thereon providing deeper optimizations than would otherwise have been possible. By way of example, where there is a sequence of producers and consumers, the consumers can also be producers that can be optimized.

The interface component 120 and/or optimization component 130 can be embodied in any number of systems or mechanisms. By way of example, the interface component 120 and optimization component 130 can be embodied in an application programming interface (API) associated with producers and consumers. Additionally or alternatively, the components 120 and 130 can form part of a compiler such that generated code including producers and consumers is optimized for execution. Further yet, the components can form part of a query processor and/or associated components. However, the claimed subject matter is not limited to these exemplary embodiments. Other embodiments are also possible and are to be deemed with in the scope of innovation.

Figure 2:
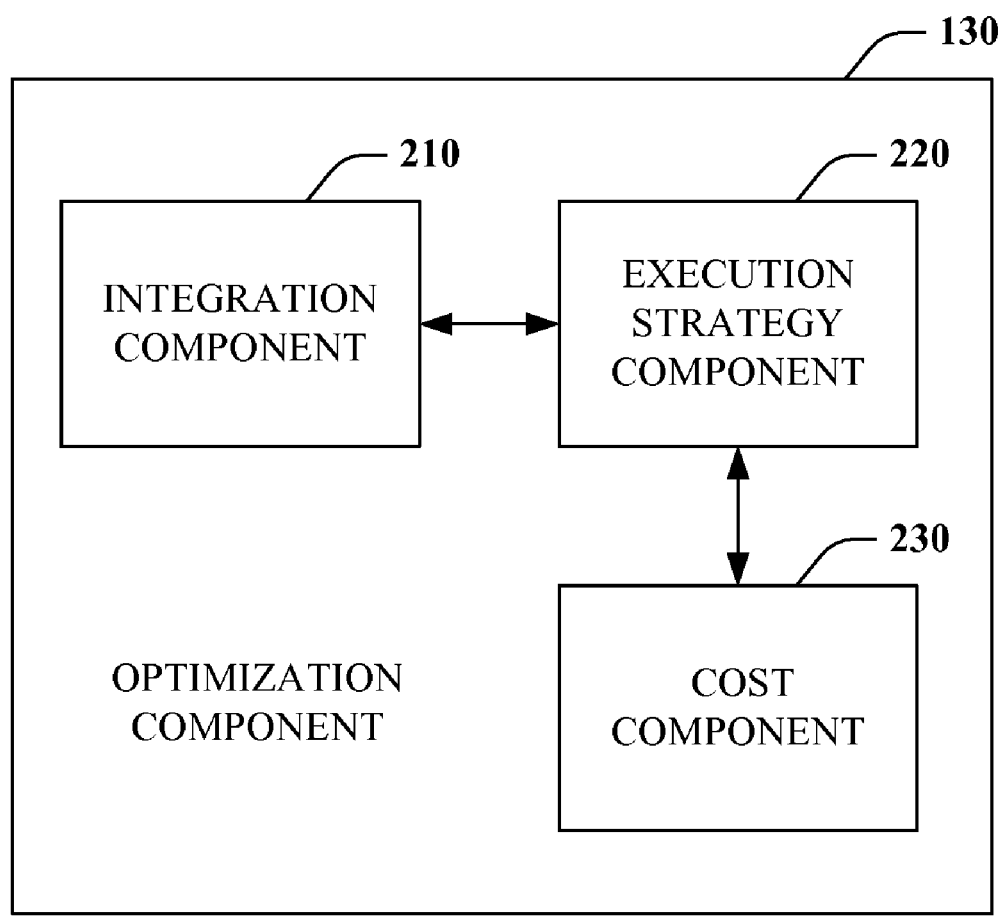
FIG. 2 is a block diagram of a representative optimization component.

Turning attention to FIG. 2, a representative optimization component 130 is depicted in accordance with an aspect of the disclosure. The optimization component 130 includes an integration component 210 to integrate or merge consumer activity with producer activity. By integrating producers and consumers, a bottleneck can be removed from the process wherein generated data is merged or packaged into a data structure and transmitted or otherwise identified to the consumer for processing.

Integration component 210 can operate over a plurality of consumers and producers. By way of example, a sequence of producers and consumers can exist where data is transformed and passed to the next element that transforms that data and passes it on to the next, etc. Essentially, there can be a pipeline of consumers that are producers themselves. The integration component 210 can integrate or aggregate all these consumers and producers together into one big group such that optimization can be applied across all consumers and producers. For instance, suppose there is a process that takes an image and performs successive transformations thereon. These transformations can be glued together into one big process such that optimization can be performed with respect to the image as a whole instead of separate parts where intermediate values are sent to the next black box. More specifically, the integration component 210 can support intra and/or inter component optimizations.

Execution strategy component 220 is operable to optimize execution of an integrated producer and consumer. In particular, the execution strategy component 220 can identify an optimized execution strategy and/or modify the code in accordance therewith. For instance, the execution strategy component 220 can employ conventional optimization approaches across a producer/consumer boundary including without limitation common sub-expression elimination and operation reordering. While these optimizations are similar to what compilers do everyday, they are different in that the execution strategy component 220 can take advantage of rich semantic knowledge to rewrite higher level operations in addition to lower level program statements.

Various parallelism approaches can also be employed by the execution strategy component 230 including partitioning and pipelining. In partitioning, code is replicated, and the replicas execute simultaneously over disjoint subsets of data. In one particular instance, multistreaming can be employed between producers and consumers to permit parallelism to extend from core production operations into consumption operations without any superfluous merge operation or other bottleneck, for example. Pipelining or pipeline parallelism divides processing tasks into a set of tasks connected in series. Tasks in each pipeline are often parallelized for example utilizing partitioning. This approach can be employed instances where partitioning alone is not efficient because of varying costs associated with task execution.

Cost component 230 identifies execution cost associated with producer and/or consumer operations. This information can be determined or inferred and supplied to the execution strategy component 220 to facilitate identification of an appropriate parallel execution strategy or degree of parallelism given the costs and available resources, for instance.

Figure 3:
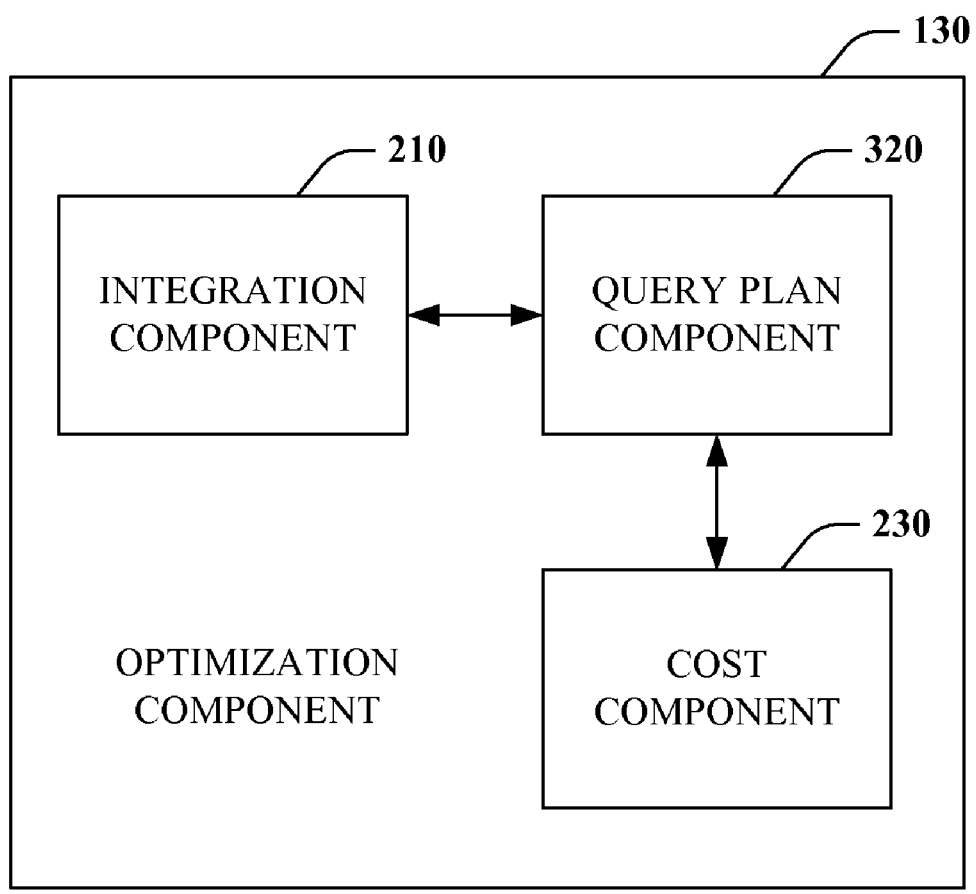
FIG. 3 is a block diagram of a representative optimization component for query processing.

FIG. 3 depicts a representative optimization component 130 with respect to a query-processing embodiment. Although not limited thereto, produces/consumer data processing can apply to query processes, namely generation of query results and processing thereof. Such queries can be traditional database queries (e.g., relational database query) or language integrated queries, among others. Similar to FIG. 2, FIG. 3 includes the integration component 210 for integrating, in this case, queries and consumers of query results and cost component 220 for determining or inferring execution cost associated with query and/or consumption operations.

Further, optimization component 130 can include a query plan component 320 that can generate and/or optimize a query plan. A query plan defines a query execution strategy for retrieving data. In accordance with an aspect of the claimed subject matter the query plan component 320 can generate and/or optimize plans as a function of consumer activity. In other words, consumption action can be incorporated into query planning optimization itself. Particular plans can be generated or modified as a function of execution cost associated with producer and/or consumer costs provided by the cost component 230.

In one implementation, the query plan component 320 can generate an abstract syntax tree or graph that represents the query itself wherein nodes identify query operations and edges identify flow between operators. Consumer activity can be incorporated therein and represented as another node in the graph or tree. Conventional and/or novel optimization techniques can be applied to the integrated representation and subsequently employed during execution via a query processor, engine, component or the like (not shown). By way of example and not limitation, such optimization techniques can include standard relational algebra-based rewrite rules, as most relational databases are employed against tree-based representations of queries.

Figure 4:
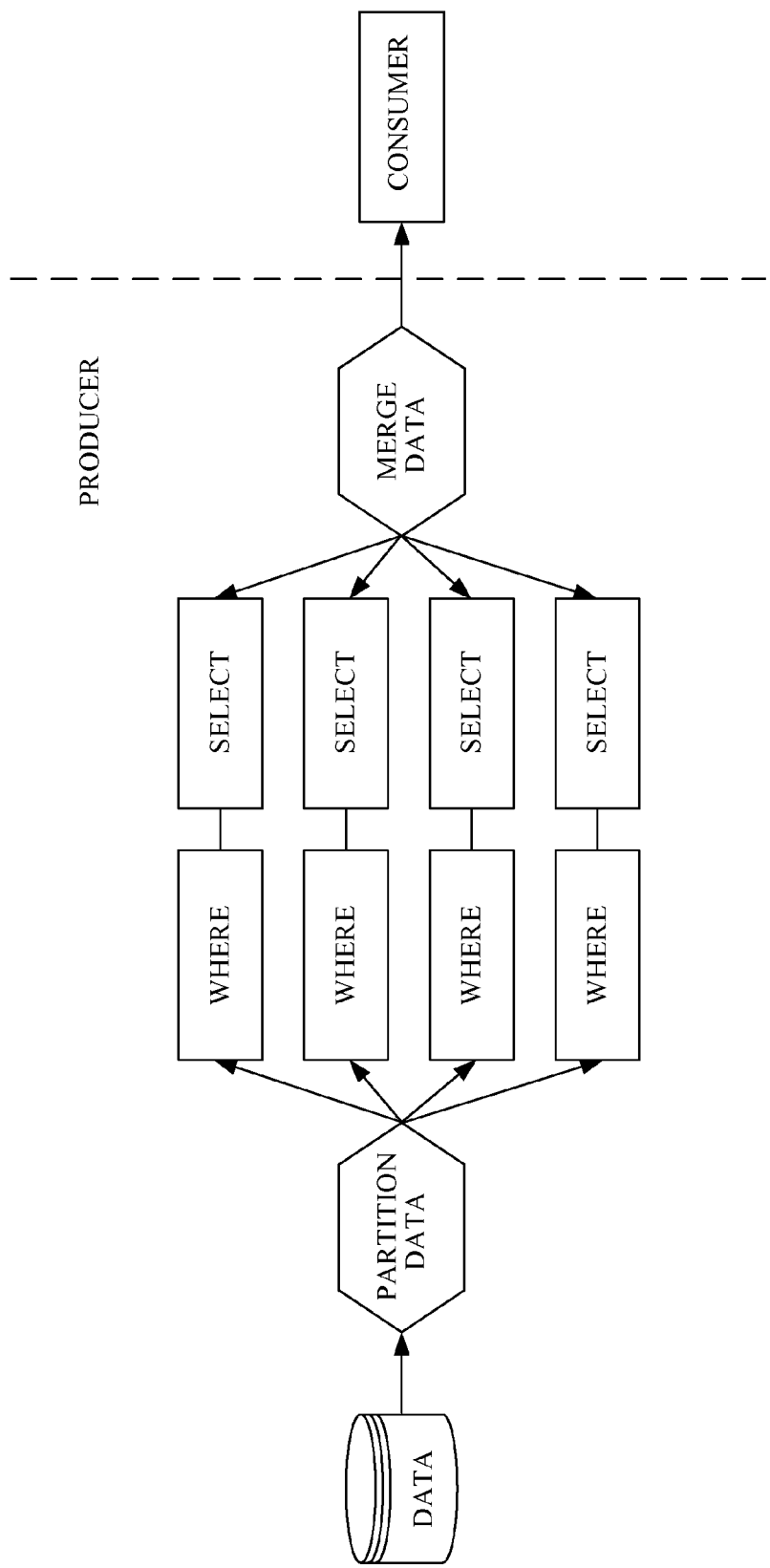
FIG. 4 is a graphical illustration of a consumer/producer processing approach.
Figure 5:
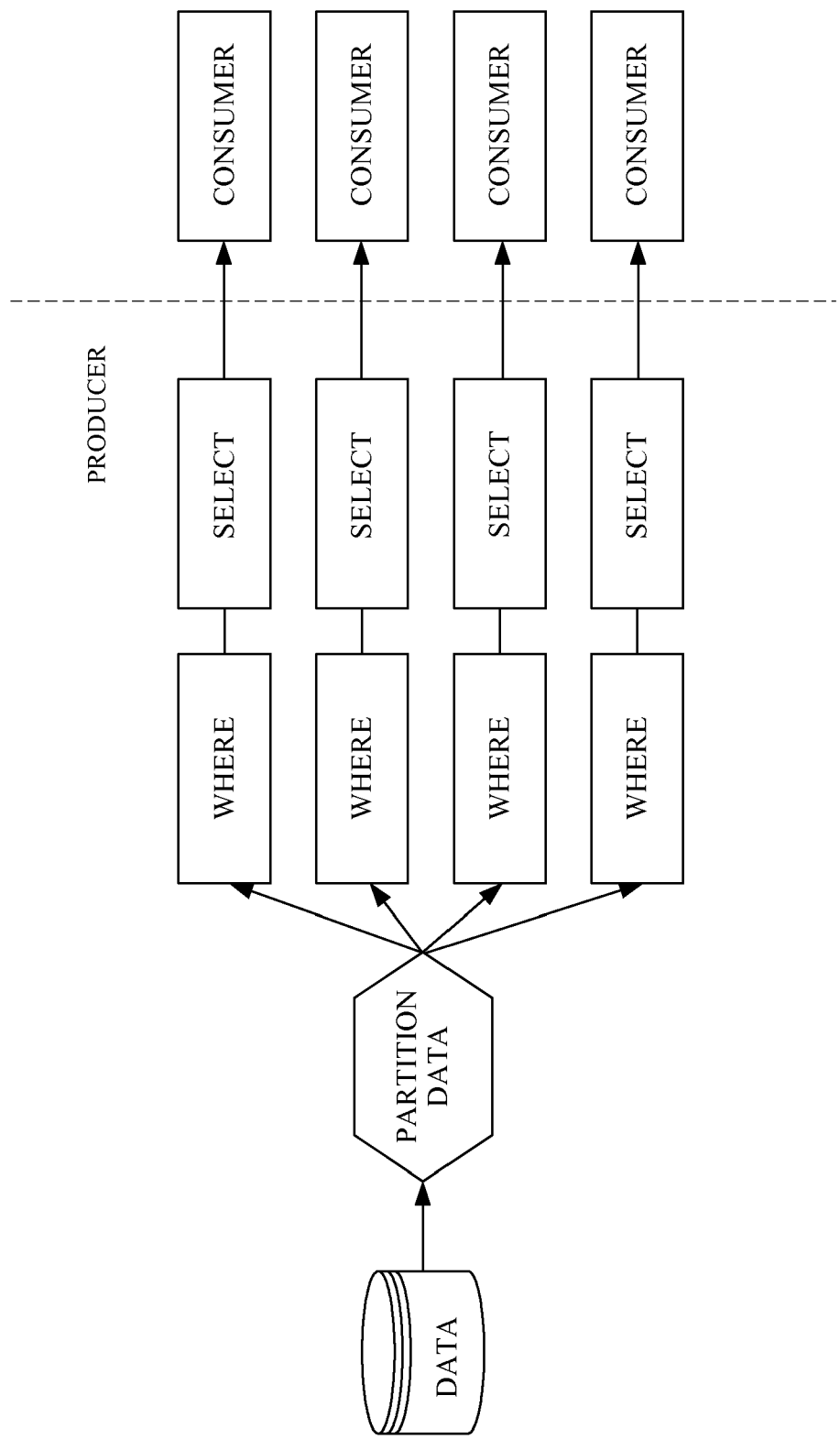
FIG. 5 is a graphical illustration of a consumer/producer processing approach utilizing partition parallelism.
Figure 6:
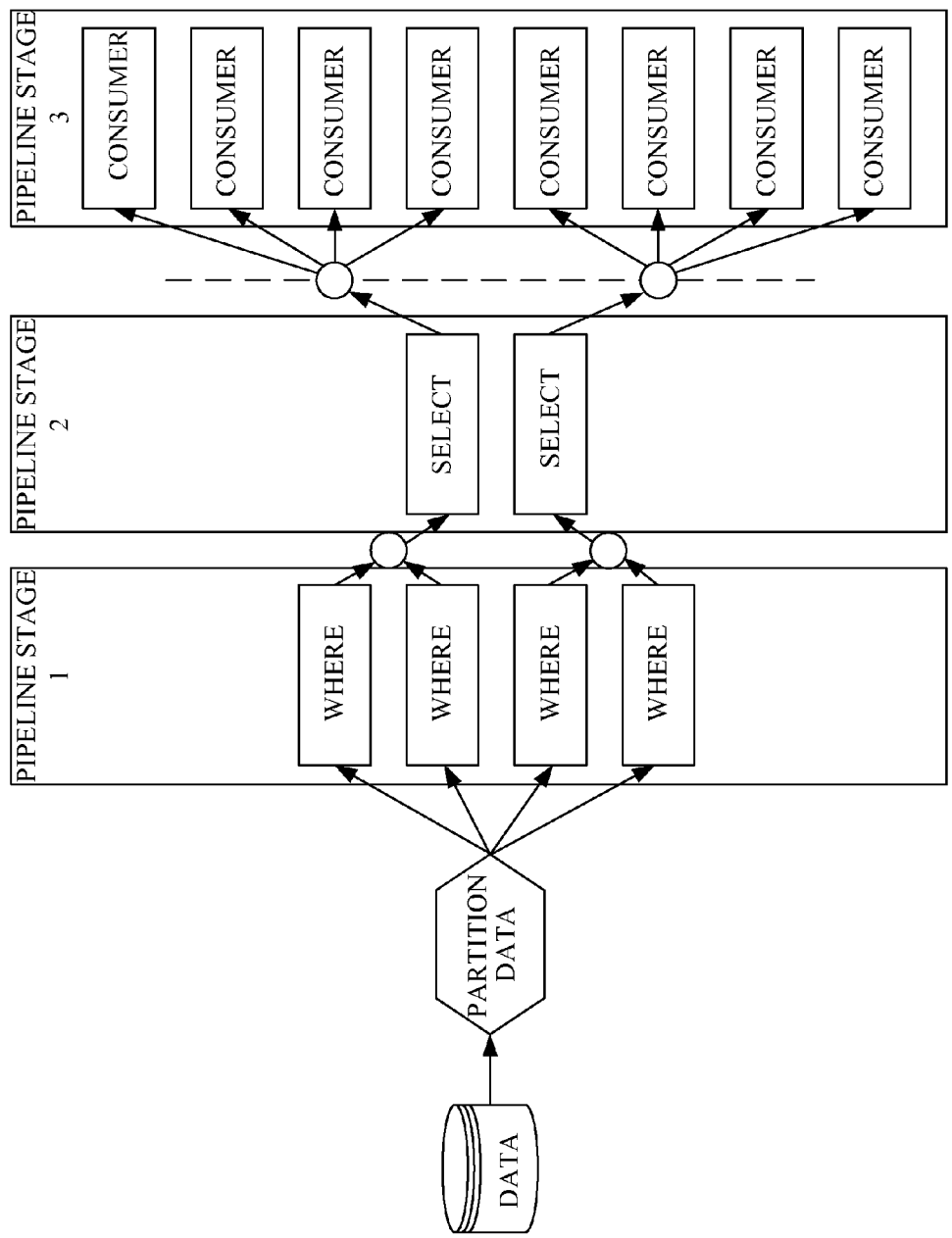
FIG. 6 is a graphical illustration of a consumer/producer processing approach utilizing pipeline parallelism.

FIGS. 4-6 provide exemplary query scenarios to facilitate clarity and understanding with respect to aspects of the claimed subject matter. It is to be appreciated that the examples and associated description are provided solely for clarity and understanding and are not meant to limit the scope of the claimed subject matter.

The following exemplary code pertains to a consumer processing situation in the context of a language integrated query:

```
void ProcessCustomer(var c) { /*...*/ }
void ProcessXyzCustomers(List<Customer> customers) {
    DateTime orderDate = DateTime.Now.Subtract(-30);
    var filtered = from c in customers
        where c.Active &&
            (c.State == "AK" || c.State == "HI") &&
            c.Orders.Count(o => o.OrderDate > orderDate) > 0
        select c;
    foreach (var c in filtered)
        ProcessCustomer(c);
}
```

More specifically, the query var filtered=from c in customers retrieves customers filtered by or including particular properties (e.g., customer activation, state and orders). Subsequently, a loop for each (var c in filtered) performs an action on each customer returned by the query, namely ProcessCustomer(c) (implementation omitted).

Referring to FIG. 4, a conventional approach to executing the above exemplary query is depicted. More specifically, FIG. 4 illustrates what might occur in a traditional approach executing on a four central processing unit (CPU) machine with a partition-parallelism approach. As shown, data is retrieved from a store and split or partitioned across the four CPUs for parallel query processing (Where, Select). Results are captured from the parallelized query, merged and subsequently provided to the consumer. Note the loss of parallelism as soon as the "end" of the producer is reached via the explicit merge. While the query processing is executing across four processors all produced data needs to be merged prior to delivery to the consumer, which is then executed without parallelism. The merge is a bottleneck in this process.

FIG. 5 graphically illustrates an optimized execution plan for the exemplary code utilizing partitioning. The limitations imposed by the previous approach are unnecessary and can hamper any query engine's ability to generate efficient plans and decisions during execution. This can be solved by modeling consumer action as another query operation. It is to be noted that this can apply to scenarios in which a consumer and producer are in the same process, in separate processes or even on separate machines. In other words, the distance between consumer and producer can be arbitrary. Accordingly, the merge action can be removed and the consumer ProcessCustomer( ) function run in parallel with other query operations. Further, the consumer could itself invoke other sub-queries or operations that could become part of an overall query execution plan.

In the code, the semicolon between select c and for each identifies the split between producer and consumer. In that case, a filtered object needs to be created and passed into the consumer loop, as previously described. What is desired is to fuse the producer and the consumer so that the loop is integrated into the query. This can result be accomplished be removing the loop and altering the query such that select c becomes select ProduceConsumer(c). Now the consumer activity can simply appear as another query operation. During query plan generation and/or optimization, consumers can be partitioned across the four CPUs and operate on a subset of data provided by the producers.

Turning to FIG. 6, another optimization approach is illustrated utilizing pipelining. Just as a query plan component and/or related components can peek inside of query operations such as Where and Select to determine and adaptively gather selectivity and cost, using this data to make better judgments about query execution now and in the future, it may also do so with a consumer. Therefore, not only can consumer activities be run in parallel, a query planner can make decisions based on this. For example, pipelining is often used to balance a query with imbalanced costs. This assumes that the planner is aware of consumer costs as traditional approaches are limited to producer activity. With this approach, a planner may choose to introduce new pipeline stages including running the consumer as its own pipeline, simply because it knows about this extension of the query.

For example, if the aforementioned exemplary query is to be executed on a multiple CPU machine and the consumer costs four times the cost of the Where which costs two times the cost of the Select portion of the query, a reasonable expectation since production is often an expensive operation, then pipelining can be used to balance the query as shown in FIG. 6. This style of optimization is simply not possible with conventional techniques and/or approaches.

Figure 7:
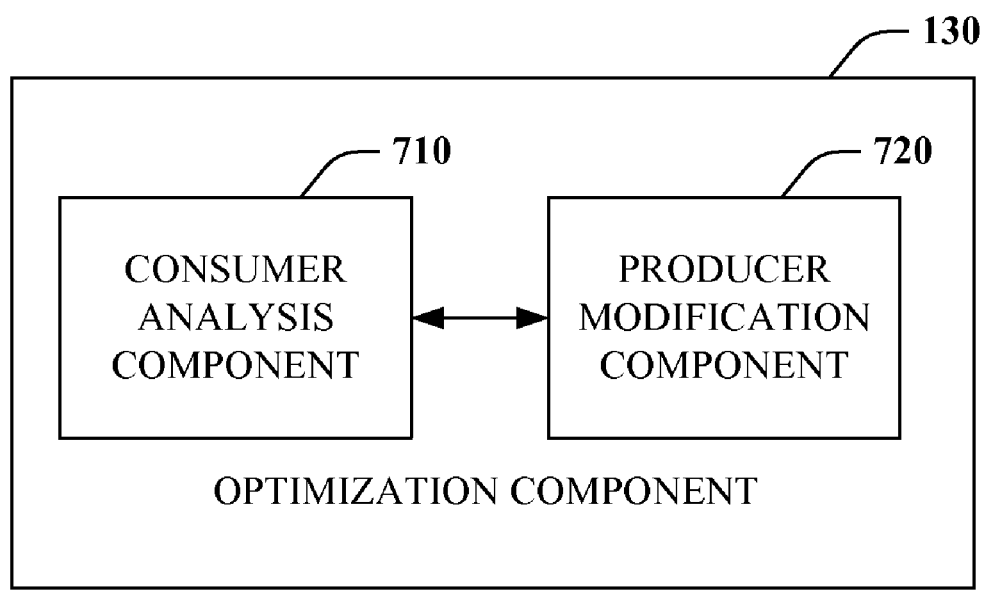
FIG. 7 is a block diagram of a representative optimization component.

Referring to FIG. 7, a representative optimization component 130 is illustrated in accordance with an aspect of the claimed subject matter. As illustrated, the optimization component 130 includes a consumer analysis component 710. The consumer analysis component 710 is a mechanism for analyzing activity across one or more consumers. Producer modification component 720 is communicatively coupled to the consumer analysis component 710 and operable to receive, retrieve or otherwise obtain consumer information. The producer modification component 720 can then modify producer activity as a function of consumer activity. By way of example, consider a situation where the producer yields customers and the consumer processes customers. If the consumer analysis component 710 can determine that a set of one or more consumers only ever utilizes a customer name, the producer modification component 720 can alter the query to produce only customer names rather than all customer information. Accordingly, large portions of computation may be able to be eliminated as a function of consumer activity such as where the producer produces that which the consumer is not interested, among other things.

It should be appreciated that by removing a black box distinction between producers and consumers various optimizations can occur. Here, optimization component 130 facilitates producer modification in light of consumer activity. This functionality can be provided alone or in combination with other optimizations including parallelism. For example, the functionality captured by the consumer analysis component 710 and producer modification component 720 can be captured and/or performed by execution strategy component 220 of FIG. 2 or query plan component 320 of FIG. 3.

Figure 8:
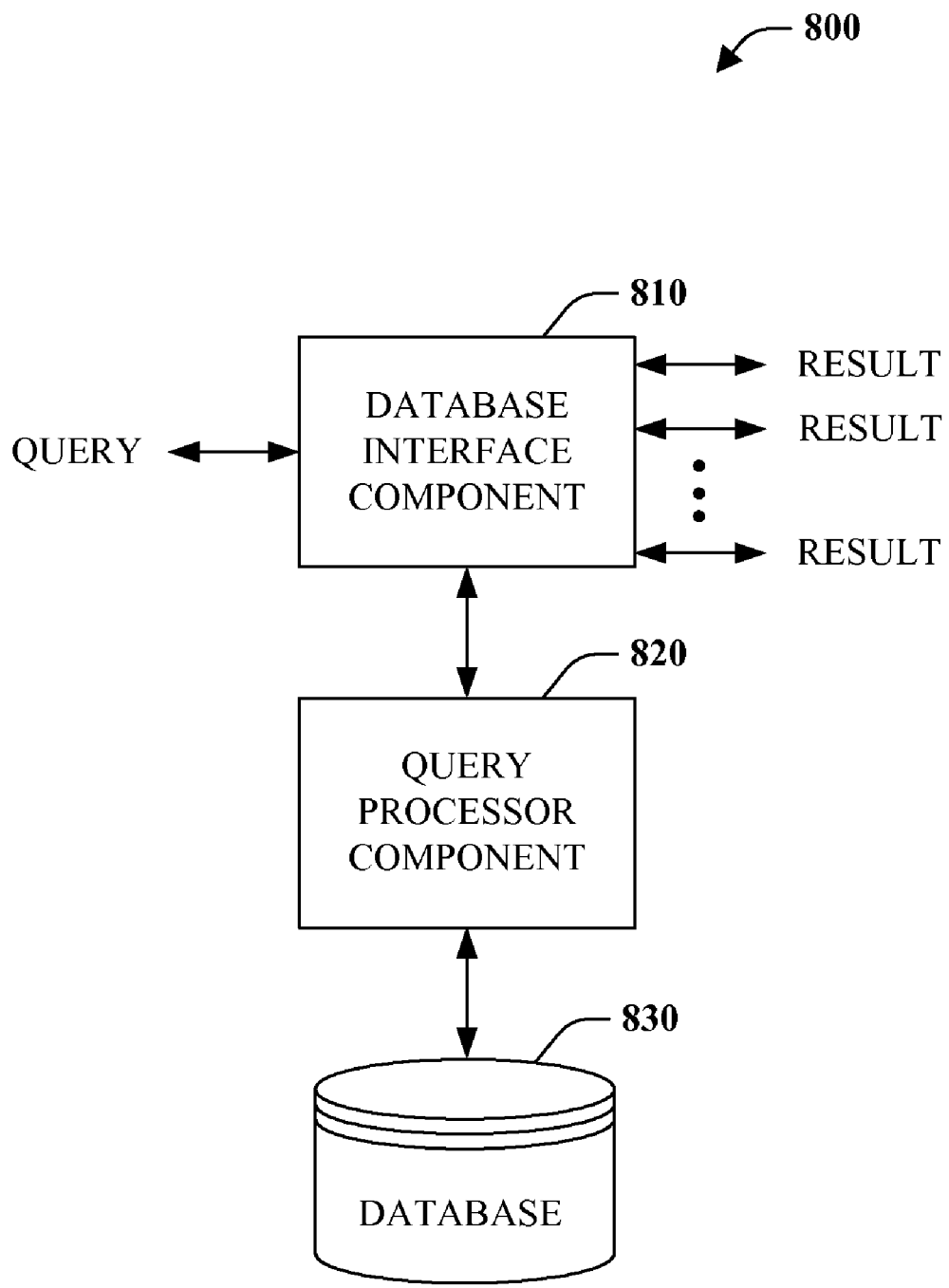
FIG. 8 is a block diagram of a database management system operable to return data for parallel consumption.

Referring to FIG. 8, a database management system 800 is illustrated in accordance with an aspect of the claimed subject matter. The database management system 800 includes a database interface component 810, query processor component 820 and database 830 for processing queries. The database interface component 810 receives, retrieves or otherwise obtains a database query and transmits it to the query processor component 820. The query processor component 820 process the query against the database 830 and returns results. In accordance with one aspect, the query processor component 820 can produce results in accordance with a particular query plan transmitted with the query or otherwise obtained. The results can be returned back to a requesting entity or process via the database interface component 810. Results need not be supplied in a single result object or one at a time as conventionally done. Alternatively, portions of data satisfying the query can be returned as they are determined and/or in accordance with a plan. In this manner, a restrictive merge operation need not be executed to generate a single result package. Instead, results can be returned in a manner that facilitates parallel consumption.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the optimization component 130 can employ such mechanism to optimize execution of producer/consumer code as a function of context including producer activity, consumer activity, operation cost, execution environment and computational load, among other things.

Figure 9:
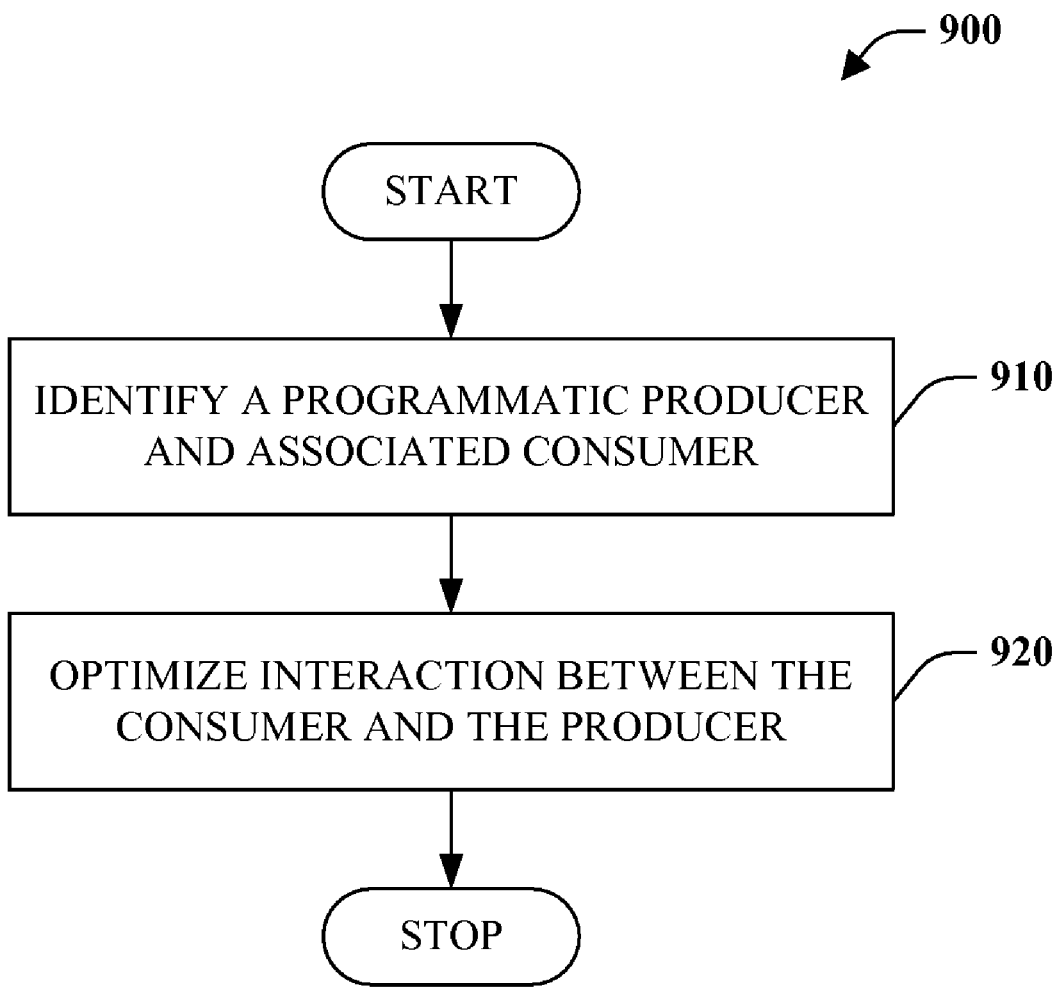
FIG. 9 is a flow chart diagram of a method of optimizing producer/consumer interaction.
Figure 10:
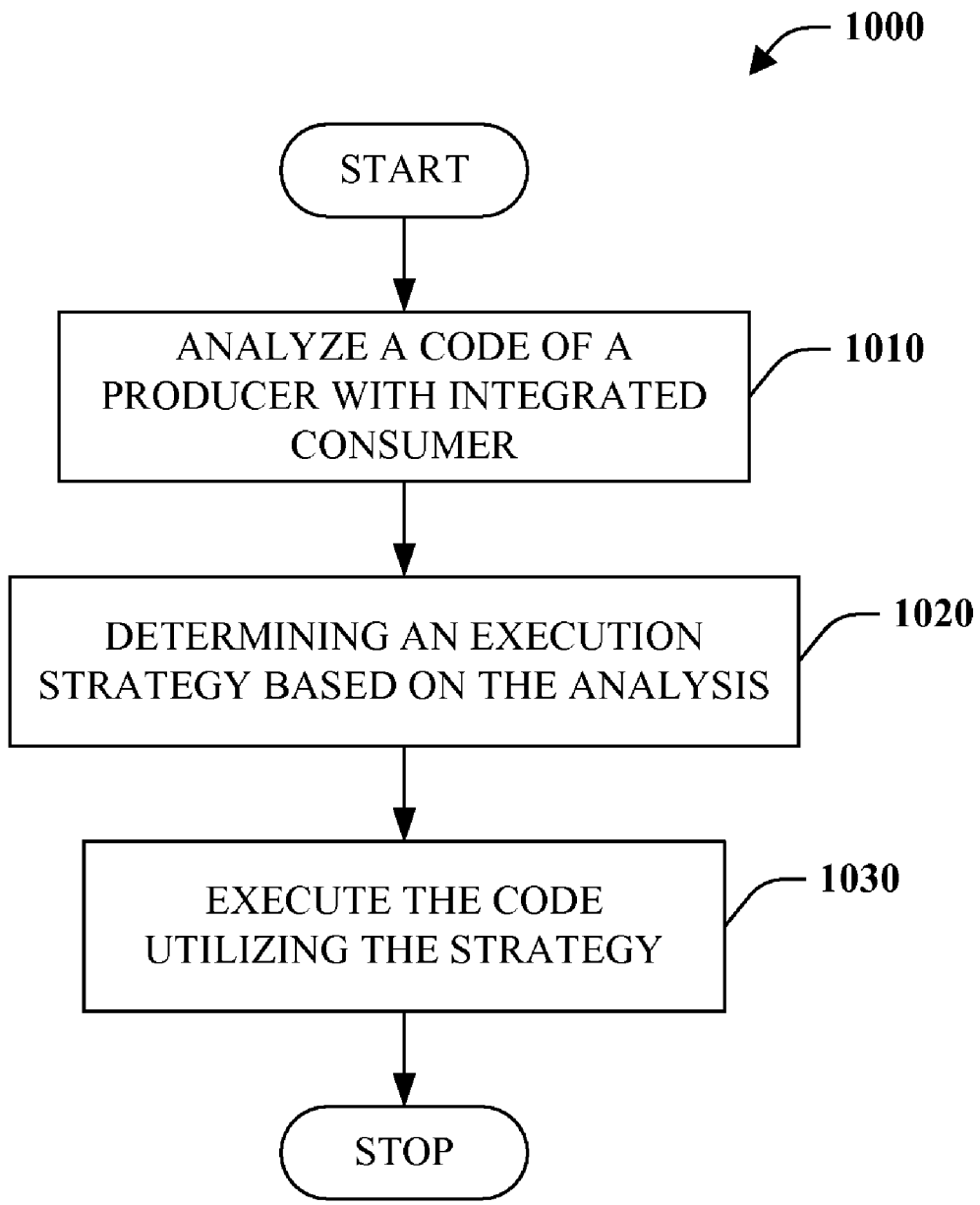
FIG. 10 is a flow chart diagram of a method of data processing.
Figure 11:
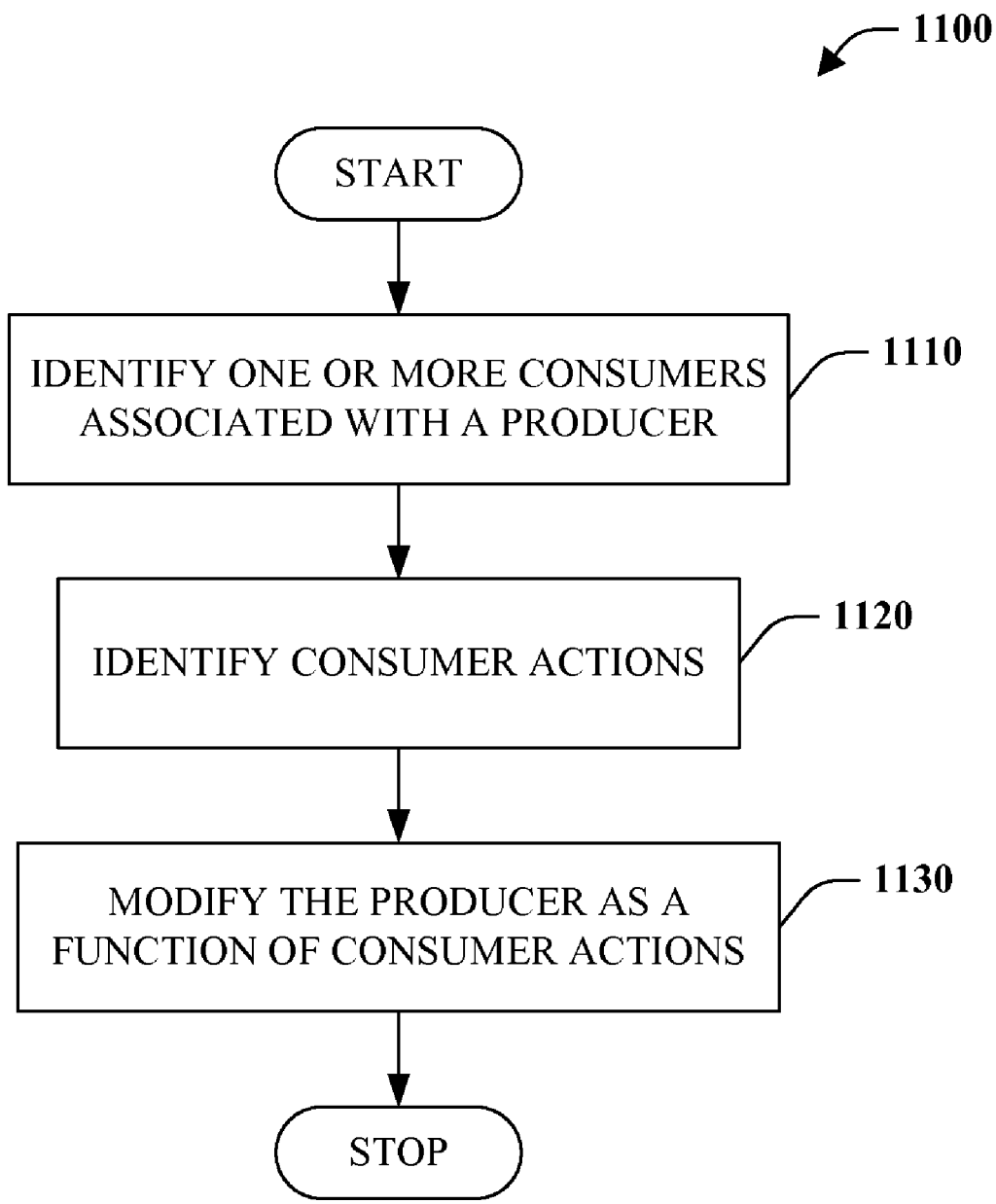
FIG. 11 is a flow chart diagram of a method of code optimization.

In view of the exemplary systems described supra, methodologies that may be implemented in accordance with the disclosed subject matter will be better appreciated with reference to the flow charts of FIGS. 9-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 9, a method 900 of optimizing producer/consumer interaction is illustrated. At reference numeral 910, a programmatic data producer and consumer are identified. The producer generates data and the consumer acts upon the data. In accordance with one embodiment, the producer can correspond to a query wherein the consumer performs some action on query results. At reference number 920, interaction between the producer and the consumer is optimized. Optimization can be based on the analysis of the activities of both the producer and one or more associated consumers. In one instance, interactions can be parallelized. For example, consumers can be replicated via partition parallelism and connected to a plurality of partitioned producer components. Accordingly, multi-streaming techniques can be employed to allow multiple independent consumers to attach to the output of a single producer without any merge bottleneck. Additionally or alternatively, producers and/or consumers can be modified in light of the activities of the other.

FIG. 10 a method of data processing 1000 is depicted in accordance with an aspect of the claimed subject matter. At reference numeral 1010, code including a producer with an integrated consumer is analyzed. A producer and consumer could have been integrated or aggregated into a single unit explicitly by a programmer or automatically (e.g., via an API, compiler, query processor . . . ). The analysis can include identifying activities/operations associated with the producer and consumer. Rather than considering the producer and consumers as black boxes, they are considered white boxes available for analysis or inspection.

At reference numeral 1020, an execution strategy is established for the code. The execution strategy concerns how the code is to be executed to optimize performance, among other things. In accordance with an aspect of the disclosure, this can correspond to query plan generation and/or optimization. Hence, the strategy can be dependent upon a plurality of factors including but not limited to producer activity, consumer activity, execution costs, execution environment and processing load. Consumer activity can be considered as an extension to the producer. Hence, consumer operations can be inspected and utilized to facilitate generation of the execution strategy.

Furthermore, conventional query optimization approaches can cross the producer/consumer boundary. For example, traditional query optimizations such as common sub-expression elimination and reordering can be performed on the consumer, which can lead to better query execution times even without any parallelism, although combining the two leads to superior results.

At reference numeral 1030, the execution strategy is implemented or executed. For example, where the execution strategy corresponds to a query plan a query execution engine can implement the plan. Alternatively, a compiler or other optimization component can implement code changes in accordance with the execution strategy, which can then subsequently be executed to perform in accordance therewith. It is also to be noted that the execution strategy can include a dynamic portion such that code execution can be responsive to runtime information. For instance, if one or more processors are not available because they are bearing load of other processes, then code execution can be modified for available resources.

Turning to FIG. 11, a flow chart diagram of a method of code optimization 1100 is illustrated in accordance with an aspect of the claimed subject matter. At reference numeral 1110, one or more consumers associated with a producer are identified. In other words, all consumers that consume or otherwise utilize data output by a given producer are discovered. Activities associated with each of the one or more consumers are identified at numeral 1120. Among other things, this may include identification of particular data on which a consumer operates. At reference numeral 1130, modifications are made to an associated producer as a function of consumer activity. While consumer activity can be merged with a producer to facilitate parallelization, the consumer activity can also be utilized to streamline producer code, among other things. By way of example, if it can be determined that one or more consumers are interested in particular data, the producer can be augmented to provide solely that data without other superfluous data that will not be used.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
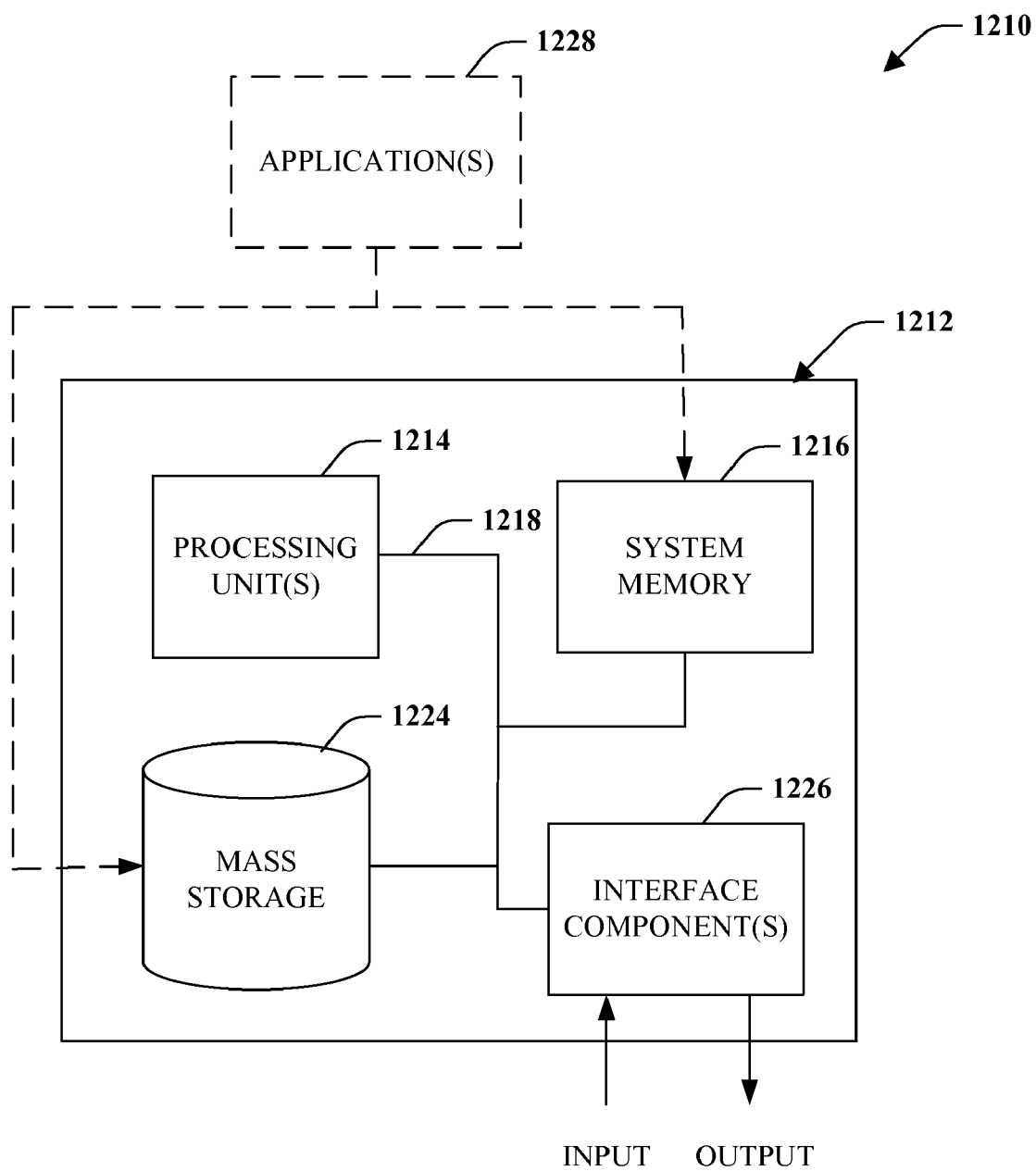
FIG. 12 is a schematic block diagram illustrating a suitable operating environment for aspects of the subject disclosure.
Figure 13:
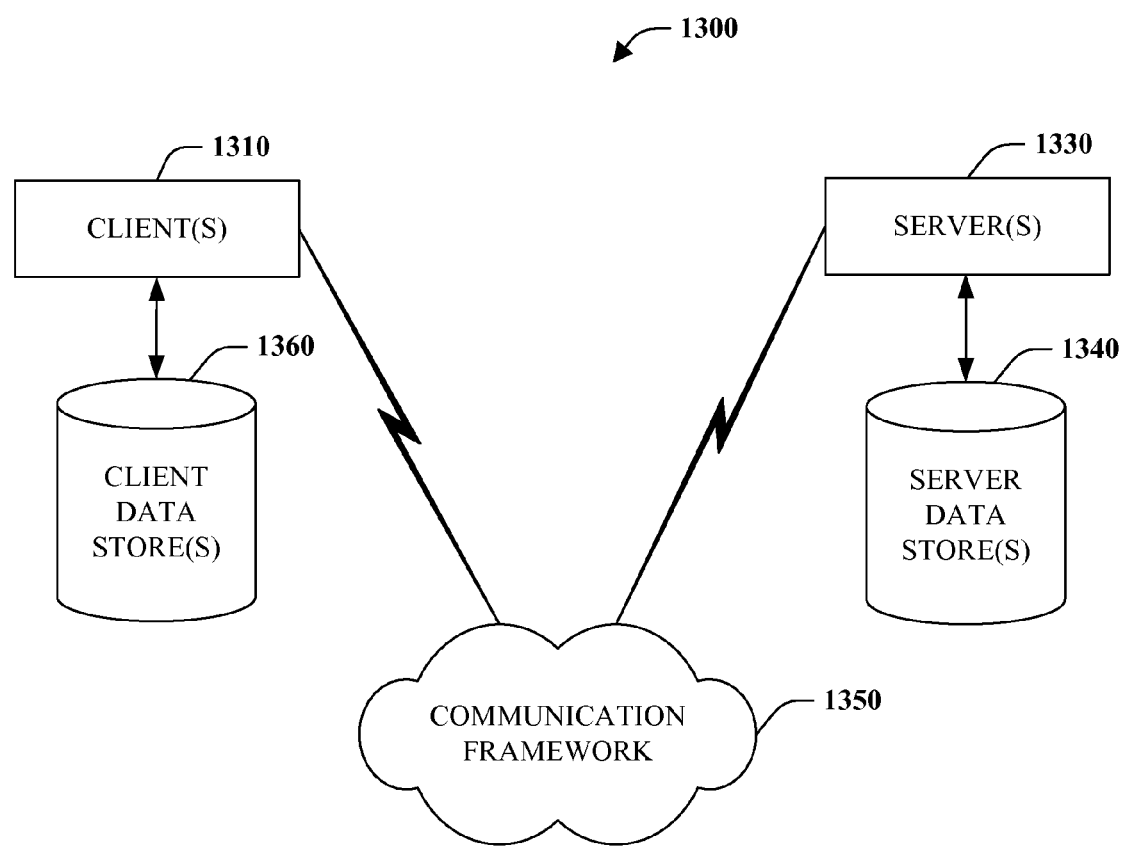
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216 and a system bus 1218. The system bus 1218 couples system components including, but not limited to, the system memory 1216 to the processing unit 1214. The processing unit 1214 can be any of various available microprocessors. It is to be appreciated that dual microprocessors, multi-core and other multiprocessor architectures can be employed as the processing unit 1214.

The system memory 1216 includes volatile and nonvolatile memory. The basic input/output system (BIOS), containing the basic routines to transfer information between elements within the computer 1212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1212 also includes removable/non-removable, volatile/non-volatile computer storage media. FIG. 12 illustrates, for example, mass storage 1224. Mass storage 1224 includes, but is not limited to, devices like a magnetic or optical disk drive, floppy disk drive, flash memory or memory stick. In addition, mass storage 1224 can include storage media separately or in combination with other storage media.

FIG. 12 provides software application(s) 1228 that act as an intermediary between users and/or other computers and the basic computer resources described in suitable operating environment 1210. Such software application(s) 1228 include one or both of system and application software. System software can include an operating system, which can be stored on mass storage 1224, that acts to control and allocate resources of the computer system 1212. Application software takes advantage of the management of resources by system software through program modules and data stored on either or both of system memory 1216 and mass storage 1224.

The computer 1212 also includes one or more interface components 1226 that are communicatively coupled to the bus 1218 and facilitate interaction with the computer 1212. By way of example, the interface component 1226 can be a port (e.g., serial, parallel, PCMCIA, USB, FireWire . . . ) or an interface card (e.g., sound, video, network . . . ) or the like. The interface component 1226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1212 to output device(s) via interface component 1226. Output devices can include displays (e.g., CRT, LCD, plasma . . . ), speakers, printers and other computers, among other things.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the aspects of the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

Here, producers and consumers can exist on client(s) 1310, server(s) 1330 or distributed across client(s) 1310 and server(s) 1330. For example, consumer code can be resident on a client 1310 operable to utilized data produced by one or more servers 1330. Assuming low latency communication, producer/consumer interactions can be optimized via parallelization (e.g., partitioning, pipelining . . . ). Accordingly, producer and consumer code resident on one or more of client(s) 1310 and server(s) 1300 can be executed in parallel across the communication framework 1350. Additionally or alternatively, consumer activity information can be employed to streamline a producer for more efficient execution independent of parallelism.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A code optimization system, comprising at least one processor coupled to at least one machine-readable storage medium storing instructions executable by the at least one processor to implement:

an interface component configured to identify a programmatic data producer and consumer;

an optimization component configured to optimize interaction between the producer and the consumer;

an analysis component configured to analyze actions of the consumer;

a modification component configured to modify the producer as a function of the consumer analysis; and an integration component configured to combine activity of the consumer with activity of the producer to generate integrated code that includes activity of the producer and at least a portion of activity of the consumer, wherein the combining activity of the consumer with activity of the producer comprises:

creating a filtered object;

passing the filtered object into a loop of the consumer activity; and integrating the loop of the consumer activity into a query of the producer activity to fuse the producer activity and the consumer activity by removing the loop and altering the query of the producer activity so that consumer activity is a query operation of the producer activity.

2. The system of claim 1, wherein the integration component is configured to integrate the producer and consumer into a single unit of code.

3. The system of claim 2, further comprising a component configured to determine a parallel execution strategy for the single unit.

4. The system of claim 2, wherein the producer and/or the consumer includes a database query.

5. The system of claim 2, wherein the producer and/or the consumer includes a language-integrated query.

6. The system of claim 5, further comprising a component configured to generate a query plan to extend parallelism between query operations and consumer code.

7. The system of claim 6, further comprising a component configured to determine cost associated with the consumer code to facilitate pipelining.

8. The system of claim 1, wherein the modification component is configured to modify the producer by altering a query associated with the producer.

9. The system of claim 1, wherein the components form part of a compiler.

10. The system of claim 1, wherein the components form part of an application programming interface.

11. A computer-implemented method of processing data, comprising:
   identifying a programmatic data producer and consumer;
   optimizing interaction between the producer and the consumer;
   analyzing actions of the consumer;
   modifying the producer as a function of the consumer analysis; and
   combining activity of the consumer with activity of the producer to generate integrated code that includes activity of the producer and at least a portion of activity of the consumer, wherein the combining activity of the consumer with activity of the producer comprises:
   creating a filtered object;
   passing the filtered object into a consumer loop; and
   integrating the loop of the consumer activity into a query of the producer activity to fuse the producer activity and the consumer activity by removing the loop and altering the query of the producer activity so that consumer activity is a query operation of the producer activity.

12. A computer-readable storage medium storing instructions, the instructions to, if executed by a computing device, cause the computing device to perform operations comprising:
   identifying a programmatic data producer and consumer;
   optimizing interaction between the producer and the consumer;
   analyzing actions of the consumer;
   modifying the producer as a function of the consumer analysis; and
   combining activity of the consumer with activity of the producer to generate integrated code that includes activity of the producer and at least a portion of activity of the consumer, wherein the combining activity of the consumer with activity of the producer comprises:
   creating a filtered object;
   passing the filtered object into a consumer loop; and
   integrating the loop of the consumer activity into a query of the producer activity to fuse the producer activity and the consumer activity by removing the loop and altering the query of the producer activity so that consumer activity is a query operation of the producer activity.

* * * * *